(12) United States Patent  (10) Patent No.: US 7,739,828 B2
Baird, III  (45) Date of Patent: Jun. 22, 2010

(54) MODULAR APPARATUS FOR PROTECTING AGAINST INSECT ATTACKS

(76) Inventor: Raleigh William Baird, III, 3742 Ella Lee La., Houston, TX (US) 77027

( * ) Notice: Subject to any disclaimer, the term of this patent is extended or adjusted under 35 U.S.C. 154(b) by 160 days.

(21) Appl. No.: 11/545,864

(22) Filed: Oct. 11, 2006

(65) Prior Publication Data

US 2007/0175087 A1 Aug. 2, 2007

Related U.S. Application Data

(63) Continuation-in-part of application No. 11/346,035, filed on Feb. 2, 2006, now abandoned.

(51) Int. Cl.
*A01M 1/20* (2006.01)
(52) U.S. Cl. ...................................... 43/132.1
(58) Field of Classification Search .................. 43/124, 43/134, 138, 132.1, 140, 900
See application file for complete search history.

(56) References Cited

U.S. PATENT DOCUMENTS

| | | | |
|---|---|---|---|
| 4,618,099 A | 10/1986 | Nagao et al. | |
| 4,621,770 A | 11/1986 | Sayen | |
| 4,651,903 A | 3/1987 | Pagliai | |
| 4,790,454 A | 12/1988 | Clark et al. | |
| 4,881,687 A | 11/1989 | Ballu | |
| 5,174,343 A | 12/1992 | Rood | |
| 5,501,032 A * | 3/1996 | Pitman | 43/129 |
| 6,029,863 A | 2/2000 | Ogram | |
| 6,339,897 B1 * | 1/2002 | Hayes et al. | 43/132.1 |

OTHER PUBLICATIONS

Birchmeier Backpacks sprayer product description, found at: http://www.qspray.com/birchmeier.html?gclid=CPybpq-supICFRYsIgodSh-1Xg; printed on Apr. 1, 2008.
B&G Masterline Sprayer product description, found at: http://www.pestcontrol-products.com/spray_hand.htm; printed on Apr. 1, 2008.
Gilmour Spray-Doc product description, sprayer product description, found at: http://www.gilmour.com/Tank_Sprayers/Wheel_Pump/Default.asp; printed on Apr. 1, 2008.
Black&Decker re-chargable garden sprayer product description, found at: http://www.blackanddecker.com/productguide/product-details.aspx?productid=13579&toolview=4#details; printed on April 1, 2008.

(Continued)

*Primary Examiner*—Thomas Price
(74) *Attorney, Agent, or Firm*—Conley Rose, P.C.

(57) ABSTRACT

Apparatus and method for protecting against and stopping an attack by stinging flying insects. The apparatus is modular and activated by an operator of a mobile conveyance turned victim of an insect attack. A tank contains an insect killing solution, and the tank is fluidly connected by a hose with a delivery system that is characterized by a plurality of spray nozzles. In response to an attack by stinging flying insects, an operator activates an electric pump that delivers the solution from the tank to the delivery system under pressure via the hose. The pump, hose and delivery system are incorporated into the tank, with the hose and delivery system disposed in channels on the surface of the tank, in order to create a modular assembly that may be mounted to the mobile conveyance.

20 Claims, 2 Drawing Sheets

OTHER PUBLICATIONS

Ace Hardware Poly Tank sprayer product description, found at: http://www.acehardware.com/product/index.jsp-?productId=1273504&cp=1255133.1260209&pg=2&parentPage=family; printed on Apr. 1, 2008.

* cited by examiner

MODULAR APPARATUS FOR PROTECTING AGAINST INSECT ATTACKS

CROSS-REFERENCE TO RELATED APPLICATIONS

The present application is a continuation in part of application Ser. No. 11/346,035, filed on Feb. 2, 2006 now abandoned and entitled "Apparatus for Protecting Against Insect Attacks."

STATEMENT REGARDING FEDERALLY SPONSORED RESEARCH OR DEVELOPMENT

Not Applicable.

FIELD OF THE INVENTION

The present invention relates generally to protecting against stinging flying insects, and more particularly relates to apparatus for thwarting attacks of stinging flying insects. Still more particularly, the present invention relates to a modular apparatus for delivering a spray or mist of a surfactant solution to stop an attack of stinging insects and to assist victims in evading such attacks.

BACKGROUND

Despite their value as pollinators and producers of honey and wax, bees are generally unwelcome in the vicinity of people because of the possibility that the bees may swarm, attack, and repeatedly sting those nearby. Bees may attack unsuspecting persons without provocation, and leave the person without a defense to the swarm. Increasing the concerns associated with bee attacks is the migration of "Africanized" honeybees into the southern regions of the United States. These Africanized honeybees attack with more intensity and persistence than the indigenous species of honeybee, often stinging their victim hundreds of times. With the movement of Africanized honeybees, or so-called "killer bees," into an area, it becomes even more important to make available means to protect against and end attacks by swarming bees before the results are fatal.

Research has shown that a person may defend against attacks from certain bees by exposing the bees to a surfactant spray or mist. In some instances, the surfactant may comprise a mixture of soap and water. The soap, upon contacting a bee, breaks down the waxy protective covering of the bee's breathing system, thereby drowning the bees in the water. Sprayer devices that deliver a low volume flow of a surfactant spray or mist in response to an attack are effective for controlling and killing certain less aggressive, indigenous bees. However, a low volume surfactant spray or mist response may not be suitable to combat an attack by a swarm of more aggressive "killer bees" given the greater intensity and persistence of attack.

A surfactant spray or mist method of bee protection may be effective and practicable in situations where a capable sprayer device is readily available and can be quickly moved into proximity to apply the surfactant spray or mist to the person under attack. Even then, however, a person under attack by stinging bees may become incapacitated and unable set up and operate the equipment alone, and thus must to wait for help to arrive. The victim is typically forced to wait for the arrival of the fire department or another responder with the capability to rescue a victim from a stinging flying insect attack. To further compound the problem, attacks by aggressive bees often occur in remote locations where prompt response from the fire department or other responder is unlikely or even impossible, thereby making the chance of a high volume sprayer device arriving in time to end the attack unreliable. Ranchers and farmers, for example, are frequently alone when attacked, such as when operating a tractor, entering a remote barn or shed, cutting brush, or fixing fences. As such, a need exists for a mobile modular system that can provide a spray or mist of surfactant with enough intensity to effectively protect against and stop a large swarm of aggressive killer bees, and that can be integrated into a mobile conveyance and arranged to be self-administered with little thought or coordinated effort when under the stress of an attack.

SUMMARY OF THE PREFERRED EMBODIMENTS

The embodiments of the described herein are directed to apparatus for delivering a spray or mist of an insect-killing solution, such as a surfactant, to a person being attacked and stung by the insects. It is desired to provide a modular flying insect protection device that is mobile, self-contained, and can deliver a flow of surfactant spray or mist sufficient to quickly kill and/or thwart a large swarm of aggressive bees. The embodiments of the modular flying insect protection device described herein allow for use of the modular flying insect protection device in various environments and applications that can be utilized when rapid outside rescue response is not reliably available.

In one embodiment, the modular flying insect protection device includes a tank, an electric pump, a tubular member, a delivery system, and a surfactant solution. The tank may be comprised of plastic or fiberglass and may be sized according to the desired level of portability for each embodiment of the device. The electric pump is desired to have enough power to deliver the surfactant solution at a flow rate of 1-3 gallons per minute (GPM) and may be mounted to or located within the tank. The tubular member may be a hose connected between the tank and the delivery system and may be mounted to the tank. The tubular member allows for fluid communication between the tank and delivery system. The delivery system is characterized by a plurality of spray nozzles that may be mounted to the tank, through which the surfactant solution is expelled. The surfactant solution is contained in the tank, and may be comprised of a mixture of soap and water. In certain embodiments, the tank is mounted to a mobile conveyance and is positioned behind an operator such that the nozzles of the delivery system are directed to expel the surfactant solution on the operator. An alternative embodiment includes an additional handheld delivery system that may be stored within the tank. In such embodiments, an additional coiled hose may be provided to supply the handheld delivery system, wherein the coiled hose may be self-retracting within a separate compartment of the tank.

When an operator in proximity of a modular flying insect protection device is attacked by a swarm of bees or other flying stinging insects, the operator may engage an actuator to activate the electric pump, thereby pressurizing the surfactant solution. The surfactant solution is pumped from the tank by the electric pump through the tubular member and to the delivery system. The surfactant solution is atomized when pumped through the plurality of spray nozzles of the delivery system, creating a surfactant spray or mist that is directed to surround and soak the operator under attack. The operator under attack is enveloped in the overlapping spray and mist fields of the delivery system, such that the operator is covered with the surfactant solution. The surfactant spray or mist also contacts the bees attacking the operator, killing the stinging bees and stopping the attack.

Thus, the embodiments described herein comprise a combination of features and characteristics that are directed to overcoming various shortcomings of prior devices. The various characteristics described above, as well as other features, will be readily apparent to those skilled in the art upon reading the following detailed description of the preferred embodiments of the invention, and be referring to the accompanying drawings.

BRIEF DESCRIPTION OF THE DRAWINGS

For a more detailed description of the embodiments, reference will now be made to the following accompanying drawings, wherein.

DETAILED DESCRIPTION OF THE PREFERRED EMBODIMENTS

Figure 1A:
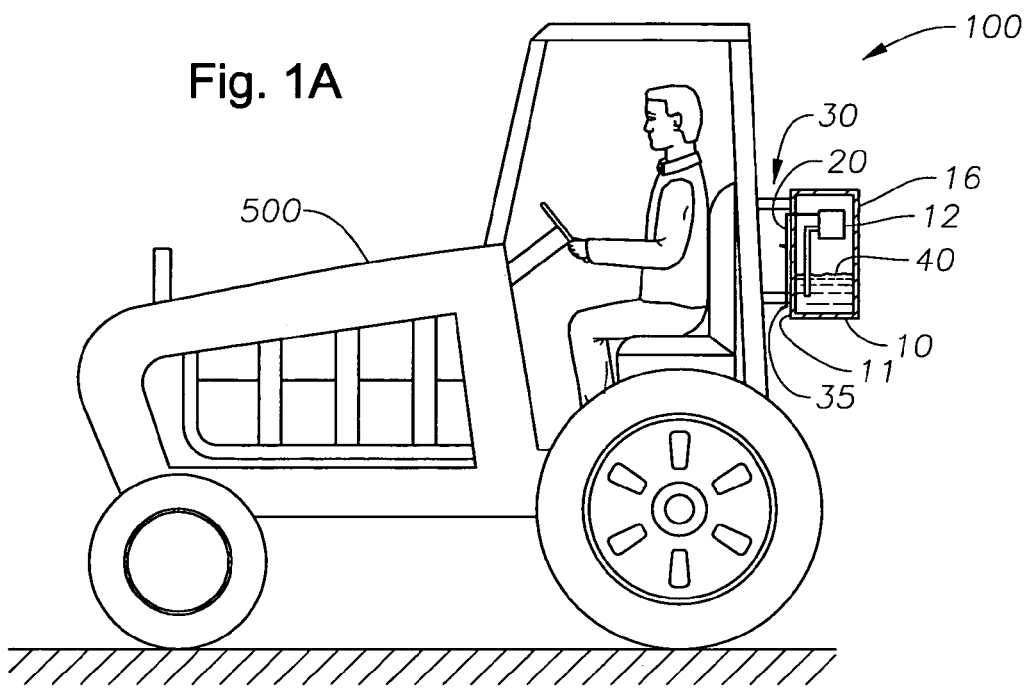
FIG. 1A is a schematic elevation view of the modular flying insect protection device disposed on a farm tractor.

In the drawings and description that follows, like parts are marked throughout the specification and drawings with the same reference numerals, respectively. The drawing figures are not necessarily to scale. Certain features of the invention may be shown exaggerated in scale or in somewhat schematic form, and some details of conventional elements may not be shown in the interest of clarity and conciseness.

The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. Further, use of any form of the terms "connect", "engage", "couple", "attach", or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

Referring initially to FIG. 1A, modular flying insect protection device 100 is shown. Modular flying insect protection device 100 includes tank 10, electric pump 12, tubular member 20, delivery system 30, and surfactant solution 40. Tubular member 20 and delivery system 30 are mounted on an outer surface 11 of tank 10. Electric pump 12 is preferably a self-priming, diaphragm pump that is mounted on an outer surface of or within tank 10, and is preferably powered by a DC motor (not shown). Tank 10 is mounted directly to a mobile conveyance, such as tractor 500 shown in FIG. 1A.

The DC motor driving electric pump 12 is preferably powered by connection to the battery (not shown) of tractor 500. In certain embodiments, tank 10 is comprised of plastic, such as LDPE, or may alternatively be comprised of fiberglass or any other suitable light-weight material.

Figure 2A:
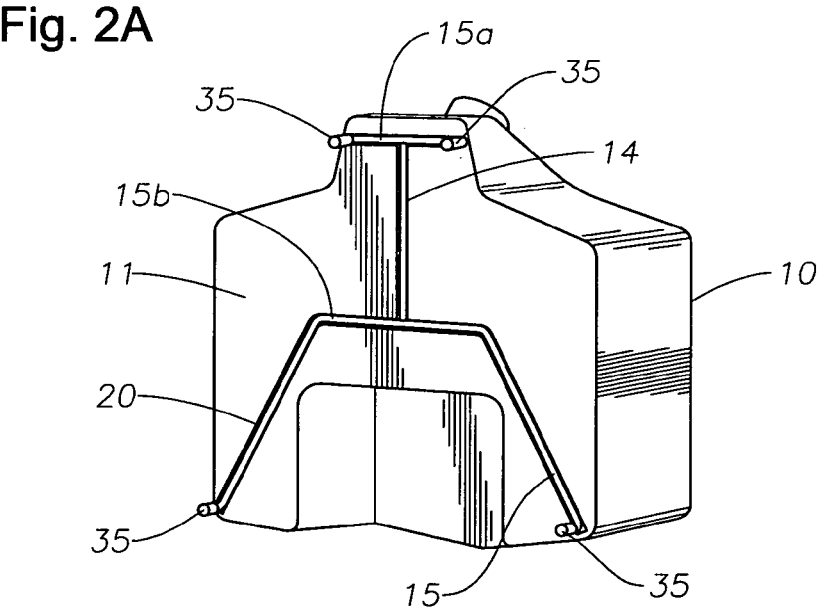
FIG. 2A is a schematic view of the tank of the modular flying insect protection device.

Referring to FIG. 2A, tank 10 is characterized on at least one outer surface by channel 14. Channel 14 is preferably formed on outer surface 11 of tank 10 during the manufacturing process, and is approximately one and a half inches deep and one and a half inches wide. Channel 14 is oriented in a vertical position on outer surface 11 of tank 10, and has a first and second end from which branches 15a and 15b are formed. Branches 15a and 15b are formed on outer surface 11 of tank 10 during the manufacturing process, and are the same depth and width as channel 14. Branch 15a may be positioned in a horizontal orientation relative to the operational position of tank 10, while branch 15b may be positioned in a diagonal orientation relative to the operational position of tank 10. Tubular member 20 is positioned and secured on the outer surface 11 of tank 10 within channel 14 and branches 15a and 15b. Tubular member 20 is fluidly connected between fluid reservoir 16 of tank 10 and delivery system 30. Tubular member 20 enters tank 10 through a threaded grommet (not shown) and extends into fluid reservoir 16. In certain embodiments, tubular member 20 is a hose, and may be comprised of rubber, plastic, or other suitable flexible tubular material. Tubular member 20 may likewise be comprised of rigid or non-rigid conduit.

Fluid reservoir 16 of tank 10 is filled with surfactant solution 40 and may have a volumetric capacity in the range of four to thirty gallons. The size of tank 10 in the varying embodiments of modular flying insect protection device 100 is dependent upon the anticipated and/or desired use. In this particular embodiment, tank 10 preferably has a volumetric capacity of sixteen gallons. Referring again to FIG. 1, in the present embodiment tank 10 is mounted to a wheeled vehicle or a mobile conveyance, such as tractor 500. The configuration of tank 10 is such that it may be connected to tractor 500 with components tubular member 20, delivery system 30, electric pump 12, and surfactant solution 40 integrally attached to tank 10, thereby providing the modular characteristic of the present embodiment. Tank 10 is preferably positioned in an area behind the operator of tractor 500, and is oriented in such a manner so that outer surface 11 of tank 10, characterized by channel 14 and branches 15a and 15b, is adjacent to and faces the back of the operator.

In certain embodiments, delivery system 30 may be comprised of a plurality of nozzles 35. Nozzles 35 are mounted to tank 10 in proximity to the operator of tractor 500 and are fluidly connected to the portions of tubular member 20 positioned in branches 15a and 15b. As used herein, the phrase "fluidly connected" means that the components are interconnected in a manner that permits fluid flow there between. More specifically, in certain embodiments nozzles 35 may be situated at four locations within branches 15a and 15b on tank 10, and are directed toward the operator. The four locations of nozzles 35 may be distributed across the length and width of tank 10, such that a first pair of nozzles 35 are located at a first, upper elevation within branch 15a, and a second pair of nozzles 35 are located at a second, lower elevation within branch 15b. Further, one of each of the first pair and second pair of nozzles 35 are located to the left side and right side of the centerline of tank 10, thereby providing a source of surfactant solution 40 that is capable of surrounding the operator on at least three sides. Surfactant solution 40 is delivered from tank 10 via tubular member 20 to nozzles 35 under pressure from electric pump 12, and is expelled from nozzles 35 in the direction of the operator. Nozzles 35 may be comprised of brass, and may deliver a wide-field, conical-shaped spray (as illustrated by the dashed lines in FIG. 2B) of surfactant solution 40, a more concentrated direct stream of surfactant solution 40, or some combination thereof.

When an operator riding a mobile conveyance such as tractor 500 equipped with a modular flying insect protection device 100 is attacked by stinging flying insects, device 100 is utilized to deliver a spray or mist of surfactant solution 40 from nozzles 35 that envelopes the operator under attack. Electric pump 12 pressurizes surfactant solution 40 contained in fluid reservoir 16 of tank 10, delivering surfactant solution 40 under pressure through tubular member 20 located in channel 14 and branches 15a and 15b to nozzles 35. The pressure on surfactant solution 40 created by electric pump 12 forces surfactant solution 40 through nozzles 35, thereby delivering surfactant solution 40 in a stream, spray, mist or small droplets. As the field of spray or mist of surfactant solution 40 is applied to and envelops the operator under attack, the spray or mist of surfactant solution 40 also contacts the attacking bees in the vicinity. The attacking bees exposed to the spray or mist of surfactant solution 40 from nozzles 35 are stopped and killed.

Figure 2B:
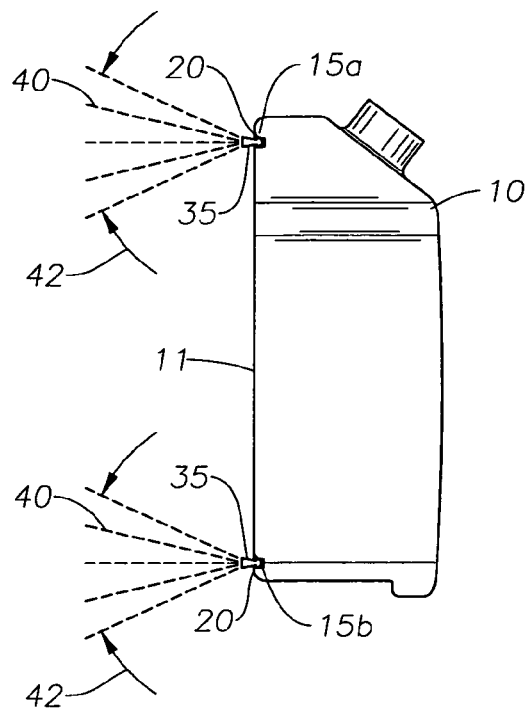
FIG. 2B is a schematic side view of the tank of the modular flying insect protection device.

It is preferred that electric pump 12 deliver the spray or mist of surfactant solution 40 through spray nozzles 35 at a flow rate of 1-3 gallons per minute. Referring now to FIG. 2B, the spray or mist of surfactant solution 40 provided by delivery system 30 preferably has a maximum linear range of 6 to 8 feet, and provides a coverage area based on a spray angle between forty-five (45) and one hundred twenty (120) degrees, as designated by arrows 42 in FIG. 2B, and more preferably, about ninety (90) degrees. In certain embodiments, surfactant solution 40 is a soap-water mixture, wherein the ratio of soap to water is 1:15. For example, surfactant solution 40 may be comprised of a mixture of 1 gallon of ZEP® liquid soap with 15 gallons of water. Alternatively, surfactant solution 40 may also be comprised of a 1:15 mixture of detergent and water, or a 1:15 mixture of shampoo and water, as further examples.

Figure 3:
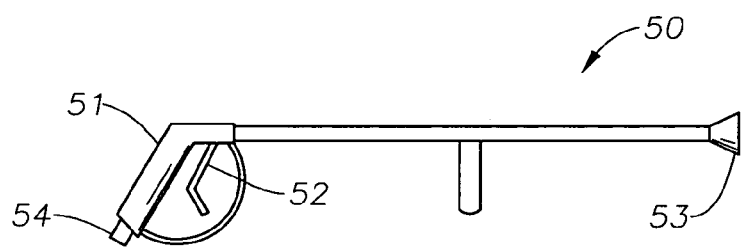
FIG. 3 is a schematic view of a handheld pressure sprayer embodiment of the delivery system.
Figure 4:
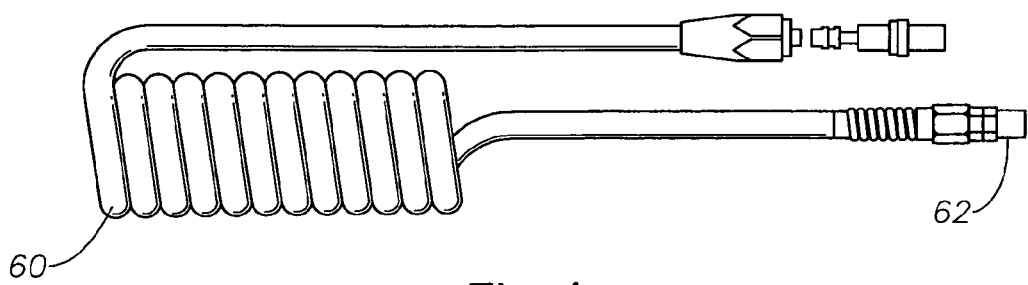
FIG. 4 is a schematic view of a coiled hose of the modular flying insect protection device.

Referring now to FIGS. 3 and 4, an alternative embodiment of device 100 may entail the use of delivery system 50 shown therein. In this embodiment, delivery system 50 may be included concurrently with, and as a supplement to, delivery system 30, and includes a grip 51, trigger 52, spray jet 53, hose couple 54, and an internal valve (not shown). Delivery system 50 may also be provided independent of and apart from delivery system 30. Delivery system 50 may be generally "L-shaped" and in the style of a pressure-washer sprayer, with spray jet 53 disposed at one end and hose couple 54 disposed at a second end. Hose couple 54 is connected at one end of grip 51 and provides an entry port for surfactant solution 40 to enter delivery system 50. A coiled hose 60 attaches to hose couple 54 via fitting 62, thereby fluidly connecting grip 51 and tank 10. Coiled hose 60 may be stored in an internal compartment (not shown) within tank 10 separate from fluid reservoir 16. Coiled hose 60 is preferably self-retracting, may be comprised of rubber, plastic, or other suitable flexible tubular material, and may be capable of being extracted up to 20 inches out of tank 10. Trigger 52 is disposed on grip 51, and trigger 52 is activated to open and close the internal valve located in the internal passage of grip 51 to control fluid flow.

The internal valve is opened by actuating trigger 52. Depressing trigger 52 further activates a switch (not shown) that energizes electric pump 12, which pressurizes surfactant solution 40 in tank 10. Surfactant solution 40 is delivered under pressure via coiled hose 60 to delivery system 50, and flows through grip 51 to spray jet 53. Surfactant solution 40 is expelled through spray jet 53 as a spray and a stream, and is directed to the operator under attack by stinging bees. Delivery system 50 may be directed so that surfactant solution 40 encompasses the operator or other person in proximity concurrently under attack, and also contacts the stinging bees, thereby stopping the attack and killing the bees.

All of the above-described embodiments mounted to a portable platform allow the modular flying insect protection device 100 to be portable and easily accessible to an operator within a short time of a bee attack. Further, these embodiments allow an operator to engage the device by a simple pull of a trigger or the pressing of a switch. Importantly too, the embodiments discussed herein allow a victim to operate the device despite the stress of the attack and without the need of outside intervention and independent of rescue efforts.

While preferred embodiments of this invention have been shown and described, modifications thereof can be made by one skilled in the art without departing from the scope or teaching herein. The embodiments described herein are exemplary only and are not limiting. It will be appreciated that many other modifications and improvements to the disclosure herein may be made without departing from the inventive concepts herein disclosed. Because many varying and different embodiments may be made within the scope of the present inventive concept, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. An assembly for stopping an attack of flying stinging insects on an operator of a riding mobile conveyance, the assembly comprising:
    a tank containing a surfactant solution, the tank mounted to said riding mobile conveyance configured to be operated by said operator;
    a pump in fluid communication with the tank;
    a delivery system having at least one nozzle;
    a tubular member fluidly connecting the tank and the delivery system;
    wherein the pump, the delivery system, and the tubular member are attached to the tank and the tank is positioned to deliver said solution onto said operator when the operator is on the riding mobile conveyance; and
    an actuator, operable by the operator, and configured to activate the pump to pressurize the surfactant in order to expel the surfactant from said delivery system onto the operator when operating the riding mobile conveyance and attacked by the flying stinging insects.

2. The assembly of claim 1 wherein said pump delivers said surfactant solution at a flow rate in the range of one gallon per minute to three gallons per minute.

3. The assembly of claim 1 wherein said surfactant solution is expelled a distance of at least six feet from said delivery system.

4. The assembly of claim 3 wherein each said nozzle is configured to expel said surfactant solution as a conical-shaped spray.

5. The assembly of claim 1 wherein said delivery system is oriented to spray in the direction of the operator, 6. The assembly of claim 1 wherein said surfactant solution is comprised of soap and water mixed at a ratio of 1:15.

7. The assembly of claim 1 wherein said delivery system comprises a plurality of nozzles.

8. The assembly of claim 7, wherein the plurality of nozzles are arranged in a pattern configured to envelop the operator with said surfactant solution when said assembly is operated to spray said surfactant solution from at least three said nozzles.

9. The assembly of claim 7 wherein the tank comprises a first surface including a plurality of channels, and wherein the tubular member and the plurality of nozzles are disposed within the plurality of channels.

10. The assembly of claim 1, further comprising:

a handheld sprayer, the handheld sprayer having a trigger;

a coiled hose, the coiled hose fluidly connecting the tank and the handheld sprayer; and wherein the handheld sprayer and coiled hose are stored within the tank, and wherein the trigger is operable by the user for activating the pump to pressurize the surfactant solution in order to expel the surfactant solution from said handheld sprayer.

11. The assembly of claim 1 wherein the riding mobile conveyance is a tractor.

12. The assembly of claim 1 wherein at least one said nozzle is mounted directly to a surface of the tank facing the position assumed by the back of an operator of said riding mobile conveyance when riding the mobile conveyance.

13. A modular pumping assembly comprising:

a tank configured to be mounted on a riding mobile conveyance proximal to the position assumed by an operator of said riding mobile conveyance when riding said mobile conveyance;

a solution comprising a surfactant contained in said tank;

a fluid delivery system comprising at least one nozzle for dispensing fluid therethrough;

a tubular member coupled in fluid communication between said tank and said fluid delivery system;

an electric pump adapted to pump said solution from said tank to said delivery system and out of said at least one nozzle;

wherein the fluid delivery system, the tubular member, and the electric pump are attached to the tank such that said tank, solution, fluid delivery system, tubular member and electric pump together comprise a modular pumping device configured for mounting on said riding mobile conveyance, and configured to dispense said solution onto said operator on said riding mobile conveyance, when said modular pumping device is mounted on said riding mobile conveyance and said pump is actuated; and a manual actuator adapted to activate said pump to cause the solution in said tank to be pumped through said tubular member to said fluid delivery system and out of said at least one nozzle.

14. The assembly of claim 13 wherein said pump delivers said solution at a flow rate in the range of one gallon per minute to three gallons per minute.

15. The assembly of claim 13 wherein said solution is expelled a distance of at least six feet from said delivery system.

16. The assembly of claim 13 wherein said solution is comprised of soap and water mixed at a ratio of 1:15.

17. The assembly of claim 13 wherein the delivery system is comprised of a plurality of nozzles.

18. The assembly of claim 17 wherein the delivery system is configured to expel the solution from the plurality of nozzles in a plurality of overlapping conical-shaped fields that envelops an area immediately in front of the tank during operation of said modular pumping assembly.

19. The assembly of claim 17 wherein the tank comprises a first surface including a plurality of channels, and wherein the tubular member and the plurality of nozzles are disposed within the plurality of channels.

20. The assembly of claim 13, further comprising:

a handheld sprayer, the handheld sprayer having a trigger;

a coiled hose, the coiled hose fluidly connecting the tank and the handheld sprayer; and wherein the handheld sprayer and coiled hose are stored within the tank, and wherein the trigger is operable for activating the pump to pressurize the solution in order to expel the solution from said handheld sprayer.

* * * * *